United States Patent [19]

Nakanishi

[11] 3,905,959
[45] Sept. 16, 1975

[54] PROCESS FOR THE MANUFACTURE OF CRYSTALLINE ANHYDROUS AMPICILLIN
[75] Inventor: Susumu Nakanishi, East Lyme, Conn.
[73] Assignee: Pfizer Inc., New York, N.Y.
[22] Filed: May 7, 1973
[21] Appl. No.: 357,581

[52] U.S. Cl.............................. 260/239.1; 424/271
[51] Int. Cl.² ....................................... C07D 499/04
[58] Field of Search .................................. 260/239.1

[56] References Cited
UNITED STATES PATENTS
3,144,445  8/1964  Grant et al...................... 260/239.1
3,157,640  11/1964  Johnson et al................... 260/239.1
3,299,046  1/1967  Auburn et al.................... 260/239.1

Primary Examiner—Nicholas S. Rizzo
Attorney, Agent, or Firm—Francis X. Murphy; Charles J. Knuth; Allen J. Spiegel

[57] ABSTRACT

An improved process for the manufacture of crystalline anhydrous ampicillin is disclosed.

3 Claims, No Drawings

PROCESS FOR THE MANUFACTURE OF CRYSTALLINE ANHYDROUS AMPICILLIN

BACKGROUND OF THE INVENTION

This invention relates to a novel, convenient and economic process for producing ampicillin. More particularly, it relates to the production of crystalline anhydrous ampicillin.

Amphoteric ampicillin, amphoteric α-aminobenzylpenicillin, a valuable broad spectrum penicillin, is described in U.S. Pat. No. 2,985,648. Two useful forms are ampicillin trihydrate, disclosed in U.S. Pat. No. 3,157,640 and crystalline anhydrous ampicillin disclosed in U.S. Pat. No. 3,144,445.

The crystalline anhydrous ampicillin described in U.S. Pat. No. 3,144,445 is prepared by heating at a temperature of from 40°–170°C. an aqueous mixture of ampicillin containing at least about 50% water at a pH of from about 3 to 7 and drying the crystals thus produced.

An amorphous compound is, in general, less desirable than is a crystalline form thereof from a preparative, storage and use standpoint. The physical characteristics of an amorphous compound such as ease of handling, and color of the compound, are generally inferior to those of a crystalline form of the same compound. Additionally, amorphous forms of a compound are frequently more hygroscopic than is a crystalline form of said compound.

For pharmaceutical usage, the above-mentioned disadvantages of an amorphous compound, relative to those of a crystalline form of the compound, are especially objectionable. The formation of acceptable dosage forms and the various pharmaceutically elegant preparations required by the medical and pharmaceutical professions is rendered difficult with an amorphous salt.

In the case of ampicillin, the disadvantages of the amorphous compound are of particular concern since it is an extremely effective broad spectrum penicillin. The preparation of crystalline ampicillin is, therefore, of great importance to the pharmaceutical and medical professions.

SUMMARY OF THE INVENTION

It has now been found that stable, crystalline anhydrous ampicillin can be conveniently prepared by a process which comprises the steps of combining from about 1 to 20 percent by weight of ampicillin trihydrate with n-propyl alcohol or n-butyl alcohol; evaporating said alcohol from acid mixture at from about −10° to 35°C. while adding fresh anhydrous n-propyl alcohol or n-butyl alcohol to maintain said concentration whereby said ampicillin is dehydrated by co-distillation; and separating and drying the resulting crystalline anhydrous ampicillin.

The process utilizes readily available equipment and is characterized by ease of manipulation, overall economy, and high quality of the crystalline compound. The stable crystalline compound of the present invention is useful in the same dosage forms and amounts for the same purposes as are the amorphous prior art products, but does not share the above-mentioned shortcomings of the amorphous product.

DETAILED DESCRIPTION OF THE INVENTION

The novel process of this invention can be used to prepare crystalline anhydrous ampicillin from amorphous ampicillin trihydrate.

The trihydrate is suspended in n-propyl alcohol or n-butyl alcohol, with the ampicillin concentration of said suspension being from about 1 to 20 percent W/W. The preferred amount is from about 2 to 10 percent W/W.

The mixture is then co-distilled at the appropriate pressure to achieve an internal (pot) temperature of from about −10° to 35°C., the preferred range being from about 0° to 25°C., at low pressure, e.g. at about 0.1 to 40 mm. of mercury, until the water content is about 10 percent based on the weight of ampicillin present.

The mixture is further distilled with the constant addition of dry n-propyl alcohol or n-butyl alcohol to yield a slurry of ampicillin containing less than 1.0 percent water. The co-distillation is carried out at from about −10° to 35°C. (internal temperature), preferably at a pressure of about 5 to 40 mm. of mercury. The slurry is then filtered and vacuum dried, yielding crystalline anhydrous ampicillin.

The procedure may be readily adapted to allow for a continuous process which will allow continuous dilution with n-propyl alcohol or n-butyl alcohol and evaporation through precipitation to a dry crystalline product.

EXAMPLE I

Ampicillin trihydrate, 10 g. (24.8 m.moles), was suspended in 500 ml. of n-propyl alcohol. The mixture was then dehydrated by distillation at 5–7 mm of Hg, utilizing a rotary evaporator with the bath temperature maintained at 35° to 40°C. by means of a water bath. The internal (pot) temperature was 4° to 10°C. Fresh dry n-propyl alcohol was added throughout the distillation at approximately the same rate as the boil-off rate. After the water content was reduced to less than 0.5%, the mixture was concentrated to about 100 ml. and filtered. The filter cake was washed with fresh dry n-propyl alcohol and the vacuum dried at 25°C. and 0.1 mm of Hg for 20 hours, yielding 6.93 g. (80%) of crystalline anhydrous ampicillin of very high quality having 0.80% water as determined by a Karl Fischer analysis.

EXAMPLE II

Ampicillin trihydrate, 10 g., was suspended in 1 liter of n-butyl alcohol. The mixture was then dehydrated by distillation at 5–7 mm of Hg, utilizing a rotary evaporator with the external temperature maintained at 50° to 55°C. by means of a water bath. The internal temperature was 4° to 10°C. Fresh dry n-butyl alcohol was added throughout the distillation at approximately the same rate as the boil-off rate. After the water content was reduced to less than 0.5%, the mixture was concentrated to about 100 ml. and filtered. The filter cake was washed with fresh dry n-butyl alcohol and then vacuum dried at 25°C. and 0.1 mm of Hg for 20 hours, yielding crystalline anhydrous ampicillin of very high quality.

EXAMPLE III

If the procedure of Example I is followed but with 100 g. of ampicillin trihydrate used instead of 10 g., comparable results are obtained.

EXAMPLE IV

Following the procedure of Example I, but dehydrating under 15 mm of mercury at an internal temperature of 15°C., comparable results are obtained.

What is claimed is:

1. A process for the manufacture of crystalline anhydrous ampicillin which comprises the steps of combining from about 1 to 20 percent of weight of amorphous ampicillin trihydrate with n-propyl alcohol or n-butyl alcohol; evaporating said alcohol from said mixture at from about −10° to 35°C. while adding fresh anhydrous n-propyl alcohol or n-butyl alcohol to maintain said concentration whereby said ampicillin is dehydrated by co-distillation; and separating and drying the resulting crystalline anhydrous ampicillin.

2. The process of claim 1 wherein said co-distillation with n-propyl alcohol or n-butyl alcohol is carried out until the water content of the residue is less than 0.5 percent W/W.

3. The process of claim 1 wherein said co-distillation is carried out at a temperature of from about 0° to 25°C.

* * * * *